US010310167B2

(12) United States Patent
Cao et al.

(10) Patent No.: US 10,310,167 B2
(45) Date of Patent: Jun. 4, 2019

(54) ILLUMINATION STRUCTURE FOR UNIFORM ILLUMINATION OF KEYS

(71) Applicant: Apple Inc., Cupertino, CA (US)

(72) Inventors: Robert Y. Cao, Cupertino, CA (US); Craig C. Leong, Cupertino, CA (US); Bradford J. Zercoe, Cupertino, CA (US); Dinesh C. Mathew, Cupertino, CA (US); Mahesh Krishnamurthi, Cupertino, CA (US); Jun Qi, Cupertino, CA (US); Rong Liu, Cupertino, CA (US); Victor H. Yin, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/261,972

(22) Filed: Sep. 11, 2016

(65) Prior Publication Data

US 2017/0090106 A1    Mar. 30, 2017

Related U.S. Application Data

(63) Continuation of application No. 15/014,596, filed on Feb. 3, 2016, now Pat. No. 9,971,084.

(Continued)

(51) Int. Cl.
*F21V 8/00* (2006.01)
*G06F 1/16* (2006.01)
(Continued)

(52) U.S. Cl.
CPC .......... *G02B 6/0061* (2013.01); *G02B 6/0038* (2013.01); *G02B 6/0045* (2013.01); *G06F 1/1662* (2013.01); *H01H 13/023* (2013.01);
*H01H 13/14* (2013.01); *H01H 13/7065* (2013.01); *H01H 13/83* (2013.01); *H01H 2219/056* (2013.01); *H01H 2219/06* (2013.01);
(Continued)

(58) Field of Classification Search
CPC .. G02B 6/0061; G02B 6/0038; G02B 6/0045; G06F 1/1662
USPC ........................................................ 362/23.03
See application file for complete search history.

(56) References Cited

U.S. PATENT DOCUMENTS 3,657,492 A    4/1972    Arndt et al.
3,917,917 A   11/1975    Murata
(Continued)

FOREIGN PATENT DOCUMENTS

CN    2155620    2/1994
CN    2394309    8/2000
(Continued)

OTHER PUBLICATIONS

Elekson, "Reliable and Tested Wearable Electronics Embedment Solutions," http://www.wearable.technology/our-technologies, 3 pages, at least as early as Jan. 6, 2016.
(Continued)

*Primary Examiner* — Mary Ellen Bowman
(74) *Attorney, Agent, or Firm* — Dorsey & Whitney LLP (57) ABSTRACT

Described is an illumination structure for a key of a keyboard. The illumination structure is used to uniformly illuminate the key and any glyphs that are present on the key. The illumination structure includes a light guide having various features that increase total internal reflection and also illuminate the glyphs of the key.

20 Claims, 6 Drawing Sheets

US 10,310,167 B2
Page 2

Related U.S. Application Data (60) Provisional application No. 62/233,975, filed on Sep. 28, 2015.

(51) Int. Cl.
  *H01H 13/02* (2006.01)
  *H01H 13/14* (2006.01)
  *H01H 13/83* (2006.01)
  *H01H 13/7065* (2006.01)

(52) U.S. Cl.
  CPC .............. *H01H 2219/062* (2013.01); *H01H 2219/0622* (2013.01)

(56) References Cited

U.S. PATENT DOCUMENTS

| | | | |
|---|---|---|---|
| 3,978,297 | A | 8/1976 | Lynn et al. |
| 4,095,066 | A | 6/1978 | Harris |
| 4,319,099 | A | 3/1982 | Asher |
| 4,349,712 | A | 9/1982 | Michalski |
| 4,484,042 | A | 11/1984 | Matsui |
| 4,596,905 | A | 6/1986 | Fowler |
| 4,598,181 | A | 7/1986 | Selby |
| 4,670,084 | A | 6/1987 | Durand et al. |
| 4,755,645 | A | 7/1988 | Naoki et al. |
| 4,937,408 | A | 6/1990 | Hattori et al. |
| 4,987,275 | A | 1/1991 | Miller et al. |
| 5,021,638 | A | 6/1991 | Nopper et al. |
| 5,092,459 | A | 3/1992 | Uljanic et al. |
| 5,136,131 | A | 8/1992 | Komaki |
| 5,278,372 | A | 1/1994 | Takagi et al. |
| 5,280,146 | A | 1/1994 | Inagaki et al. |
| 5,340,955 | A | 8/1994 | Calvillo et al. |
| 5,382,762 | A | 1/1995 | Mochizuki |
| 5,397,867 | A | 3/1995 | Demeo |
| 5,408,060 | A | 4/1995 | Muurinen |
| 5,421,659 | A | 6/1995 | Liang |
| 5,422,447 | A | 6/1995 | Spence |
| 5,457,297 | A | 10/1995 | Chen |
| 5,477,430 | A | 12/1995 | LaRose et al. |
| 5,481,074 | A | 1/1996 | English |
| 5,504,283 | A | 4/1996 | Kako et al. |
| 5,512,719 | A | 4/1996 | Okada et al. |
| 5,625,532 | A | 4/1997 | Sellers |
| 5,804,780 | A | 9/1998 | Bartha |
| 5,828,015 | A | 10/1998 | Coulon |
| 5,847,337 | A | 12/1998 | Chen |
| 5,874,700 | A | 2/1999 | Hochgesang |
| 5,875,013 | A | 2/1999 | Takahara |
| 5,876,106 | A | 3/1999 | Kordecki et al. |
| 5,878,872 | A | 3/1999 | Tsai |
| 5,881,866 | A | 3/1999 | Miyajima et al. |
| 5,898,147 | A | 4/1999 | Domzaiski et al. |
| 5,924,555 | A | 7/1999 | Sadamori et al. |
| 5,935,691 | A | 8/1999 | Tsai |
| 5,960,942 | A | 10/1999 | Thornton |
| 5,986,227 | A | 11/1999 | Hon |
| 6,020,565 | A | 2/2000 | Pan |
| 6,068,416 | A | 5/2000 | Kumamoto et al. |
| 6,215,420 | B1 | 4/2001 | Harrison et al. |
| 6,257,782 | B1 | 7/2001 | Maruyama et al. |
| 6,259,046 | B1 | 7/2001 | Iwama et al. |
| 6,377,685 | B1 | 4/2002 | Krishnan |
| 6,388,219 | B2 | 5/2002 | Hsu et al. |
| 6,423,918 | B1 | 7/2002 | King et al. |
| 6,482,032 | B1 | 11/2002 | Szu et al. |
| 6,530,283 | B2 | 3/2003 | Okada et al. |
| 6,538,801 | B2 | 3/2003 | Jacobson et al. |
| 6,542,355 | B1 | 4/2003 | Huang |
| 6,552,287 | B2 | 4/2003 | Janniere |
| 6,556,112 | B1 | 4/2003 | Van Zeeland et al. |
| 6,559,399 | B2 | 5/2003 | Hsu et al. |
| 6,560,612 | B1 | 5/2003 | Yamada et al. |
| 6,572,289 | B2 | 6/2003 | Lo et al. |
| 6,573,463 | B2 | 6/2003 | Ono |
| 6,585,435 | B2 | 7/2003 | Fang |
| 6,624,369 | B2 | 9/2003 | Ito et al. |
| 6,706,986 | B2 | 3/2004 | Hsu |
| 6,738,050 | B2 | 5/2004 | Comiskey |
| 6,750,414 | B2 | 6/2004 | Sullivan |
| 6,759,614 | B2 | 7/2004 | Yoneyama |
| 6,762,381 | B2 | 7/2004 | Kunthady et al. |
| 6,765,503 | B1 | 7/2004 | Chan et al. |
| 6,788,450 | B2 | 9/2004 | Kawai et al. |
| 6,797,906 | B2 | 9/2004 | Ohashi |
| 6,850,227 | B2 | 2/2005 | Takahashi et al. |
| 6,860,660 | B2 | 3/2005 | Hochgesang et al. |
| 6,911,608 | B2 | 6/2005 | Levy |
| 6,926,418 | B2 | 8/2005 | Ostergård et al. |
| 6,940,030 | B2 | 9/2005 | Takeda et al. |
| 6,977,352 | B2 | 12/2005 | Oosawa |
| 6,979,792 | B1 | 12/2005 | Lai |
| 6,987,466 | B1 | 1/2006 | Welch et al. |
| 6,987,503 | B2 | 1/2006 | Inoue |
| 7,012,206 | B2 | 3/2006 | Oikawa |
| 7,030,330 | B2 | 4/2006 | Suda |
| 7,038,832 | B2 | 5/2006 | Kanbe |
| 7,126,499 | B2 | 10/2006 | Lin et al. |
| 7,129,930 | B1 | 10/2006 | Cathey et al. |
| 7,134,205 | B2 | 11/2006 | Bruennel |
| 7,146,701 | B2 | 12/2006 | Mahoney et al. |
| 7,151,236 | B2 | 12/2006 | Ducruet et al. |
| 7,151,237 | B2 | 12/2006 | Mahoney et al. |
| 7,154,059 | B2 | 12/2006 | Chou |
| 7,166,813 | B2 | 1/2007 | Soma |
| 7,172,303 | B2 | 2/2007 | Shipman et al. |
| 7,189,932 | B2 | 3/2007 | Kim |
| 7,256,766 | B2 | 8/2007 | Albert et al. |
| 7,283,119 | B2 | 10/2007 | Kishi |
| 7,301,113 | B2 | 11/2007 | Nishimura et al. |
| 7,312,790 | B2 | 12/2007 | Sato et al. |
| 7,378,607 | B2 | 5/2008 | Koyano et al. |
| 7,385,806 | B2 | 6/2008 | Liao |
| 7,391,555 | B2 | 6/2008 | Albert et al. |
| 7,414,213 | B2 | 8/2008 | Hwang |
| 7,429,707 | B2 | 9/2008 | Yanai et al. |
| 7,432,460 | B2 | 10/2008 | Clegg |
| 7,510,342 | B2 | 3/2009 | Lane et al. |
| 7,531,764 | B1 | 5/2009 | Lev et al. |
| 7,541,554 | B2 | 6/2009 | Hou |
| 7,589,292 | B2 | 9/2009 | Jung et al. |
| 7,639,187 | B2 | 12/2009 | Caballero et al. |
| 7,639,571 | B2 | 12/2009 | Ishii et al. |
| 7,651,231 | B2 | 1/2010 | Chou et al. |
| 7,679,010 | B2 | 3/2010 | Wingett |
| 7,724,415 | B2 | 5/2010 | Yamaguchi |
| 7,781,690 | B2 | 8/2010 | Ishii |
| 7,813,774 | B2 | 10/2010 | Perez-Noguera |
| 7,842,895 | B2 | 11/2010 | Lee |
| 7,847,204 | B2 | 12/2010 | Tsai |
| 7,851,819 | B2 | 12/2010 | Shi |
| 7,866,866 | B2 | 1/2011 | Wahlstrom |
| 7,893,376 | B2 | 2/2011 | Chen |
| 7,923,653 | B2 | 4/2011 | Ohsumi |
| 7,947,915 | B2 | 5/2011 | Lee et al. |
| 7,999,748 | B2 | 8/2011 | Ligtenberg et al. |
| 8,063,325 | B2 | 11/2011 | Sung et al. |
| 8,077,096 | B2 | 12/2011 | Chiang et al. |
| 8,080,744 | B2 | 12/2011 | Yeh et al. |
| 8,098,228 | B2 | 1/2012 | Shimodaira et al. |
| 8,109,650 | B2 | 2/2012 | Chang et al. |
| 8,119,945 | B2 | 2/2012 | Lin |
| 8,124,903 | B2 | 2/2012 | Tatehata et al. |
| 8,134,094 | B2 | 3/2012 | Tsao et al. |
| 8,143,982 | B1 | 3/2012 | Lauder et al. |
| 8,156,172 | B2 | 4/2012 | Muehl et al. |
| 8,178,808 | B2 | 5/2012 | Strittmatter et al. |
| 8,184,021 | B2 | 5/2012 | Chou |
| 8,212,160 | B2 | 7/2012 | Tsao |
| 8,212,162 | B2 | 7/2012 | Zhou |
| 8,218,301 | B2 | 7/2012 | Lee |
| 8,232,958 | B2 | 7/2012 | Tolbert |
| 8,246,228 | B2 | 8/2012 | Ko et al. |
| 8,253,048 | B2 | 8/2012 | Ozias et al. |

(56) References Cited

U.S. PATENT DOCUMENTS

| | | |
|---|---|---|
| 8,253,052 B2 | 9/2012 | Chen |
| 8,263,887 B2 | 9/2012 | Chen et al. |
| 8,289,280 B2 | 10/2012 | Travis |
| 8,299,382 B2 | 10/2012 | Takemae et al. |
| 8,317,384 B2 | 11/2012 | Chung et al. |
| 8,319,298 B2 | 11/2012 | Hsu |
| 8,325,141 B2 | 12/2012 | Marsden |
| 8,330,725 B2 | 12/2012 | Mahowald et al. |
| 8,354,629 B2 | 1/2013 | Lin |
| 8,378,857 B2 | 2/2013 | Pance |
| 8,383,972 B2 | 2/2013 | Liu |
| 8,384,566 B2 | 2/2013 | Bocirnea |
| 8,404,990 B2 | 3/2013 | Lutgring et al. |
| 8,451,146 B2 | 3/2013 | Mahowald et al. |
| 8,431,849 B2 | 4/2013 | Chen |
| 8,436,265 B2 | 5/2013 | Koike et al. |
| 8,462,514 B2 | 6/2013 | Myers et al. |
| 8,500,348 B2 | 8/2013 | Dumont et al. |
| 8,502,094 B2 | 8/2013 | Chen |
| 8,542,194 B2 | 9/2013 | Akens et al. |
| 8,548,528 B2 | 10/2013 | Kim et al. |
| 8,564,544 B2 | 10/2013 | Jobs et al. |
| 8,569,639 B2 | 10/2013 | Strittmatter |
| 8,575,632 B2 | 11/2013 | Kuramoto et al. |
| 8,581,127 B2 | 11/2013 | Jhuang et al. |
| 8,592,699 B2 | 11/2013 | Kessler et al. |
| 8,592,702 B2 | 11/2013 | Tsai |
| 8,592,703 B2 | 11/2013 | Johnson et al. |
| 8,604,370 B2 | 12/2013 | Chao |
| 8,629,362 B1 | 1/2014 | Knighton et al. |
| 8,642,904 B2 | 2/2014 | Chiba et al. |
| 8,651,720 B2 | 2/2014 | Sherman et al. |
| 8,659,882 B2 | 2/2014 | Liang et al. |
| 8,731,618 B2 | 5/2014 | Jarvis et al. |
| 8,748,767 B2 | 6/2014 | Ozias et al. |
| 8,759,705 B2 | 6/2014 | Funakoshi et al. |
| 8,760,405 B2 | 6/2014 | Nam |
| 8,786,548 B2 | 7/2014 | Oh et al. |
| 8,791,378 B2 | 7/2014 | Lan |
| 8,835,784 B2 | 9/2014 | Hirota |
| 8,847,090 B2 | 9/2014 | Ozaki |
| 8,847,711 B2 | 9/2014 | Yang et al. |
| 8,853,580 B2 | 10/2014 | Chen |
| 8,854,312 B2 | 10/2014 | Meierling |
| 8,870,477 B2 | 10/2014 | Merminod et al. |
| 8,884,174 B2 | 11/2014 | Chou et al. |
| 8,921,473 B1 | 12/2014 | Hyman |
| 8,922,476 B2 | 12/2014 | Stewart et al. |
| 8,943,427 B2 | 1/2015 | Heo et al. |
| 8,976,117 B2 | 3/2015 | Krahenbuhl et al. |
| 8,994,641 B2 | 3/2015 | Stewart et al. |
| 9,007,297 B2 | 4/2015 | Stewart et al. |
| 9,012,795 B2 | 4/2015 | Niu et al. |
| 9,024,214 B2 | 5/2015 | Niu et al. |
| 9,029,723 B2 | 5/2015 | Pegg |
| 9,063,627 B2 | 6/2015 | Yairi et al. |
| 9,064,642 B2 | 6/2015 | Welch et al. |
| 9,086,733 B2 | 7/2015 | Pance |
| 9,087,663 B2 | 7/2015 | Los |
| 9,093,229 B2 | 7/2015 | Leong et al. |
| 9,213,416 B2 | 12/2015 | Chen |
| 9,223,352 B2 | 12/2015 | Smith et al. |
| 9,234,486 B2 | 1/2016 | Das et al. |
| 9,235,236 B2 | 1/2016 | Nam |
| 9,274,654 B2 | 3/2016 | Slobodin et al. |
| 9,275,810 B2 | 3/2016 | Pance et al. |
| 9,300,033 B2 | 3/2016 | Han et al. |
| 9,305,496 B2 | 4/2016 | Kimura |
| 9,405,369 B2 | 8/2016 | Modarres et al. |
| 9,412,533 B2 | 8/2016 | Hendren et al. |
| 9,443,672 B2 | 9/2016 | Martisauskas |
| 9,448,628 B2 | 9/2016 | Tan et al. |
| 9,448,631 B2 | 9/2016 | Winter et al. |
| 9,449,772 B2 | 9/2016 | Leong et al. |
| 9,471,185 B2 | 10/2016 | Guard |
| 9,477,382 B2 | 10/2016 | Hicks et al. |
| 9,502,193 B2 | 11/2016 | Niu et al. |
| 9,612,674 B2 | 4/2017 | Degner et al. |
| 9,734,965 B2 | 8/2017 | Martinez et al. |
| 9,793,066 B1 | 10/2017 | Brock et al. |
| 2002/0079211 A1 | 6/2002 | Katayama et al. |
| 2002/0093436 A1 | 7/2002 | Lien |
| 2002/0113770 A1 | 8/2002 | Jacobson et al. |
| 2002/0149835 A1 | 10/2002 | Kanbe |
| 2003/0169232 A1 | 9/2003 | Ito |
| 2004/0004559 A1 | 1/2004 | Rast |
| 2004/0225965 A1 | 11/2004 | Garside et al. |
| 2005/0035950 A1 | 2/2005 | Daniels |
| 2005/0253801 A1 | 11/2005 | Kobayashi |
| 2006/0011458 A1 | 1/2006 | Purcocks |
| 2006/0020469 A1 | 1/2006 | Rast |
| 2006/0120790 A1 | 6/2006 | Chang |
| 2006/0181511 A1 | 8/2006 | Woolley |
| 2006/0243987 A1 | 11/2006 | Lai |
| 2007/0200823 A1 | 8/2007 | Bytheway et al. |
| 2007/0285393 A1 | 12/2007 | Ishakov |
| 2008/0131184 A1 | 6/2008 | Brown et al. |
| 2008/0136782 A1 | 6/2008 | Mundt et al. |
| 2008/0251370 A1 | 10/2008 | Aoki |
| 2009/0046053 A1 | 2/2009 | Shigehiro et al. |
| 2009/0103964 A1 | 4/2009 | Takagi et al. |
| 2009/0128496 A1 | 5/2009 | Huang |
| 2009/0262085 A1 | 10/2009 | Wassingbo et al. |
| 2009/0267892 A1 | 10/2009 | Faubert |
| 2010/0045705 A1 | 2/2010 | Vertegaal et al. |
| 2010/0066568 A1 | 3/2010 | Lee |
| 2010/0109921 A1 | 5/2010 | Annerfors |
| 2010/0156796 A1 | 6/2010 | Kim et al. |
| 2010/0253630 A1 | 10/2010 | Homma et al. |
| 2011/0032127 A1 | 2/2011 | Roush |
| 2011/0048908 A1 | 3/2011 | Nishino |
| 2011/0056817 A1 | 3/2011 | Wu |
| 2011/0056836 A1 | 3/2011 | Tatebe et al. |
| 2011/0205179 A1 | 8/2011 | Braun |
| 2011/0261031 A1 | 10/2011 | Muto |
| 2011/0267272 A1 | 11/2011 | Meyer et al. |
| 2011/0284355 A1 | 11/2011 | Yang |
| 2012/0012446 A1 | 1/2012 | Hwa |
| 2012/0032972 A1 | 2/2012 | Hwang |
| 2012/0090973 A1 | 4/2012 | Liu |
| 2012/0098751 A1 | 4/2012 | Liu |
| 2012/0286701 A1 | 11/2012 | Yang et al. |
| 2012/0298496 A1 | 11/2012 | Zhang |
| 2012/0313856 A1 | 12/2012 | Hsieh |
| 2013/0043115 A1 | 2/2013 | Yang et al. |
| 2013/0093500 A1 | 4/2013 | Bruwer |
| 2013/0093733 A1 | 4/2013 | Yoshida |
| 2013/0100030 A1 | 4/2013 | Los et al. |
| 2013/0120265 A1 | 5/2013 | Horii et al. |
| 2013/0161170 A1 | 6/2013 | Fan et al. |
| 2013/0215079 A1 | 8/2013 | Johnson et al. |
| 2013/0242601 A1 | 9/2013 | Kloeppel et al. |
| 2013/0270090 A1 | 10/2013 | Lee |
| 2014/0015777 A1 | 1/2014 | Park et al. |
| 2014/0027259 A1 | 1/2014 | Kawana et al. |
| 2014/0071654 A1 | 3/2014 | Chien |
| 2014/0082490 A1 | 3/2014 | Jung et al. |
| 2014/0090967 A1 | 4/2014 | Inagaki |
| 2014/0098042 A1 | 4/2014 | Kuo et al. |
| 2014/0118264 A1 | 5/2014 | Leong et al. |
| 2014/0151211 A1 | 6/2014 | Zhang |
| 2014/0184496 A1 | 7/2014 | Gribetz et al. |
| 2014/0191973 A1 | 7/2014 | Zellers et al. |
| 2014/0218851 A1 | 8/2014 | Klein et al. |
| 2014/0252881 A1 | 9/2014 | Dinh et al. |
| 2014/0291133 A1 | 10/2014 | Fu et al. |
| 2014/0375141 A1 | 12/2014 | Nakajima |
| 2015/0016038 A1 | 1/2015 | Niu et al. |
| 2015/0083561 A1 | 3/2015 | Han et al. |
| 2015/0090570 A1 | 4/2015 | Kwan et al. |
| 2015/0090571 A1 | 4/2015 | Leong et al. |
| 2015/0270073 A1 | 9/2015 | Yarak, III et al. |
| 2015/0277559 A1 | 10/2015 | Vescovi et al. |
| 2015/0287553 A1 | 10/2015 | Welch et al. |

(56) References Cited

U.S. PATENT DOCUMENTS

| | | | |
|---|---|---|---|
| 2015/0309538 A1 | 10/2015 | Zhang | |
| 2015/0332874 A1 | 11/2015 | Brock et al. | |
| 2015/0348726 A1 | 12/2015 | Hendren | |
| 2015/0370339 A1 | 12/2015 | Ligtenberg et al. | |
| 2015/0378391 A1 | 12/2015 | Huitema et al. | |
| 2016/0048163 A1* | 2/2016 | Degner | G06F 1/1658 361/679.27 |
| 2016/0049266 A1 | 2/2016 | Stringer et al. | |
| 2016/0093452 A1 | 3/2016 | Zercoe et al. | |
| 2016/0172129 A1 | 6/2016 | Zercoe et al. | |
| 2016/0189890 A1 | 6/2016 | Leong et al. | |
| 2016/0189891 A1* | 6/2016 | Zercoe | H01H 13/023 200/5 A |
| 2016/0259375 A1 | 9/2016 | Andre et al. | |
| 2016/0329166 A1 | 11/2016 | Hou et al. | |
| 2016/0336124 A1 | 11/2016 | Leong et al. | |
| 2016/0336127 A1 | 11/2016 | Leong et al. | |
| 2016/0336128 A1 | 11/2016 | Leong et al. | |
| 2016/0343523 A1 | 11/2016 | Hendren et al. | |
| 2016/0351360 A1 | 12/2016 | Knopf et al. | |
| 2016/0365204 A1 | 12/2016 | Cao et al. | |
| 2016/0378234 A1 | 12/2016 | Ligtenberg et al. | |
| 2016/0379775 A1 | 12/2016 | Leong et al. | |
| 2017/0004937 A1 | 1/2017 | Leong et al. | |
| 2017/0004939 A1 | 1/2017 | Kwan et al. | |
| 2017/0011869 A1 | 1/2017 | Knopf et al. | |
| 2017/0090106 A1 | 3/2017 | Cao et al. | |
| 2017/0301487 A1 | 10/2017 | Leong et al. | |
| 2017/0315624 A1 | 11/2017 | Leong et al. | |
| 2018/0029339 A1 | 2/2018 | Liu et al. | |
| 2018/0040441 A1 | 2/2018 | Wu et al. | |
| 2018/0074694 A1 | 3/2018 | Lehmann et al. | |

FOREIGN PATENT DOCUMENTS

| | | |
|---|---|---|
| CN | 1533128 | 9/2004 |
| CN | 1542497 | 11/2004 |
| CN | 2672832 | 1/2005 |
| CN | 1624842 | 6/2005 |
| CN | 1812030 | 8/2006 |
| CN | 1838036 | 9/2006 |
| CN | 1855332 | 11/2006 |
| CN | 101051569 | 10/2007 |
| CN | 200961844 | 10/2007 |
| CN | 200986871 | 12/2007 |
| CN | 101146137 | 3/2008 |
| CN | 201054315 | 4/2008 |
| CN | 201084602 | 7/2008 |
| CN | 201123174 | 9/2008 |
| CN | 201149829 | 11/2008 |
| CN | 101315841 | 12/2008 |
| CN | 201210457 | 3/2009 |
| CN | 101438228 | 5/2009 |
| CN | 101465226 | 6/2009 |
| CN | 101494130 | 7/2009 |
| CN | 101502082 | 8/2009 |
| CN | 201298481 | 8/2009 |
| CN | 101546667 | 9/2009 |
| CN | 101572195 | 11/2009 |
| CN | 101800281 | 8/2010 |
| CN | 101807482 | 8/2010 |
| CN | 101868773 | 10/2010 |
| CN | 201655616 | 11/2010 |
| CN | 102110542 | 6/2011 |
| CN | 102119430 | 7/2011 |
| CN | 201904256 | 7/2011 |
| CN | 102163084 | 8/2011 |
| CN | 201927524 | 8/2011 |
| CN | 201945951 | 8/2011 |
| CN | 201945952 | 8/2011 |
| CN | 201956238 | 8/2011 |
| CN | 102197452 | 9/2011 |
| CN | 202008941 | 10/2011 |
| CN | 202040690 | 11/2011 |
| CN | 102280292 | 12/2011 |
| CN | 102338348 | 2/2012 |
| CN | 102375550 | 3/2012 |
| CN | 202205161 | 4/2012 |
| CN | 102496509 | 6/2012 |
| CN | 10269527 | 8/2012 |
| CN | 102622089 | 8/2012 |
| CN | 102629526 | 8/2012 |
| CN | 202372927 | 8/2012 |
| CN | 102679239 | 9/2012 |
| CN | 102683072 | 9/2012 |
| CN | 202434387 | 9/2012 |
| CN | 202523007 | 11/2012 |
| CN | 102832068 | 12/2012 |
| CN | 102955573 | 3/2013 |
| CN | 102956386 | 3/2013 |
| CN | 102969183 | 3/2013 |
| CN | 103000417 | 3/2013 |
| CN | 103165327 | 6/2013 |
| CN | 103180979 | 6/2013 |
| CN | 203012648 | 6/2013 |
| CN | 203135988 | 8/2013 |
| CN | 103377841 | 10/2013 |
| CN | 103489986 | 1/2014 |
| CN | 203414880 | 1/2014 |
| CN | 103681056 | 3/2014 |
| CN | 103699181 | 4/2014 |
| CN | 203520312 | 4/2014 |
| CN | 203588895 | 5/2014 |
| CN | 103839715 | 6/2014 |
| CN | 103839720 | 6/2014 |
| CN | 103839722 | 6/2014 |
| CN | 103903891 | 7/2014 |
| CN | 103956290 | 7/2014 |
| CN | 203733685 | 7/2014 |
| CN | 104021968 | 9/2014 |
| CN | 204102769 | 1/2015 |
| CN | 204117915 | 1/2015 |
| CN | 104517769 | 4/2015 |
| CN | 204632641 | 9/2015 |
| CN | 105097341 | 11/2015 |
| DE | 2530176 | 1/1977 |
| DE | 3002772 | 7/1981 |
| DE | 29704100 | 4/1997 |
| DE | 202008001970 | 8/2008 |
| EP | 0441993 | 8/1991 |
| EP | 1835272 | 9/2007 |
| EP | 1928008 | 6/2008 |
| EP | 2202606 | 6/2010 |
| EP | 2426688 | 3/2012 |
| EP | 2439760 | 4/2012 |
| EP | 2463798 | 6/2012 |
| EP | 2664979 | 11/2013 |
| FR | 2147420 | 3/1973 |
| FR | 2911000 | 7/2008 |
| FR | 2950193 | 3/2011 |
| GB | 1361459 | 7/1974 |
| JP | S50115562 | 9/1975 |
| JP | S60055477 | 3/1985 |
| JP | S61172422 | 10/1986 |
| JP | S6272429 | 4/1987 |
| JP | S63182024 | 11/1988 |
| JP | H0422024 | 4/1992 |
| JP | H0520963 | 1/1993 |
| JP | H0524512 | 8/1993 |
| JP | H05342944 | 12/1993 |
| JP | H09204148 | 8/1997 |
| JP | H10312726 | 11/1998 |
| JP | H11194882 | 7/1999 |
| JP | 2000010709 | 1/2000 |
| JP | 2000057871 | 2/2000 |
| JP | 2000339097 | 12/2000 |
| JP | 2001100889 | 4/2001 |
| JP | 2003114751 | 9/2001 |
| JP | 2002260478 | 9/2002 |
| JP | 2002298689 | 10/2002 |
| JP | 2003522998 | 7/2003 |
| JP | 2005031412 A | 2/2005 |
| JP | 2005108041 | 4/2005 |

(56) References Cited

FOREIGN PATENT DOCUMENTS

| | | |
|---|---|---|
| JP | 2006164929 | 6/2006 |
| JP | 2006185906 | 7/2006 |
| JP | 2006521664 | 9/2006 |
| JP | 2006269439 | 10/2006 |
| JP | 2006277013 | 10/2006 |
| JP | 2006344609 | 12/2006 |
| JP | 2007115633 | 5/2007 |
| JP | 2007514247 | 5/2007 |
| JP | 2007156983 | 6/2007 |
| JP | 2008021428 | 1/2008 |
| JP | 2008041431 | 2/2008 |
| JP | 2008100129 | 5/2008 |
| JP | 2008191850 | 8/2008 |
| JP | 2008533559 | 8/2008 |
| JP | 2008293922 | 12/2008 |
| JP | 2009099503 | 5/2009 |
| JP | 2009181894 | 8/2009 |
| JP | 2010061956 | 3/2010 |
| JP | 2010244088 | 10/2010 |
| JP | 2010244302 | 10/2010 |
| JP | 3167038 U | 1/2011 |
| JP | 2011018484 | 1/2011 |
| JP | 2011049092 A | 3/2011 |
| JP | 2011065126 | 3/2011 |
| JP | 2011150804 | 8/2011 |
| JP | 2011165630 | 8/2011 |
| JP | 2011524066 | 8/2011 |
| JP | 2011187297 | 9/2011 |
| JP | 2012022473 | 2/2012 |
| JP | 2012043705 | 3/2012 |
| JP | 2012063630 | 3/2012 |
| JP | 2012098873 | 5/2012 |
| JP | 2012134064 | 7/2012 |
| JP | 2012186067 | 9/2012 |
| JP | 2012230256 | 11/2012 |
| JP | 2014017179 | 1/2014 |
| JP | 2014026807 | 2/2014 |
| JP | 2014216190 | 11/2014 |
| JP | 2014220039 | 11/2014 |
| JP | 2016053778 | 4/2016 |
| KR | 1019990007394 | 1/1999 |
| KR | 1020020001668 | 1/2002 |
| KR | 100454203 | 10/2004 |
| KR | 1020060083032 | 7/2006 |
| KR | 1020080064116 | 7/2008 |
| KR | 1020080066164 | 7/2008 |
| KR | 2020110006385 | 6/2011 |
| KR | 1020120062797 | 6/2012 |
| KR | 1020130040131 | 4/2013 |
| KR | 20150024201 | 3/2015 |
| TV | V201108284 | 3/2011 |
| TW | 200703396 | 1/2007 |
| TW | M334397 | 6/2008 |
| TW | 201108286 | 3/2011 |
| TW | M407429 | 7/2011 |
| TW | 201246251 | 11/2012 |
| TW | 201403646 | 1/2014 |
| WO | WO9744946 | 11/1997 |
| WO | WO2005/057320 | 6/2005 |
| WO | WO2006/022313 | 3/2006 |
| WO | WO2007/049253 | 5/2007 |
| WO | WO2008/045833 | 4/2008 |
| WO | WO2009/005026 | 1/2009 |
| WO | WO2012/011282 | 1/2012 |
| WO | WO2012/027978 | 3/2012 |
| WO | WO2013/096478 | 6/2013 |
| WO | WO2014175446 | 10/2014 |

OTHER PUBLICATIONS

U.S. Appl. No. 14/472,260, filed Aug. 28, 2014, pending.
U.S. Appl. No. 14/501,680, filed Sep. 30, 2014, pending.
U.S. Appl. No. 15/014,596, filed Feb. 3, 2016, pending.
U.S. Appl. No. 15/230,724, filed Aug. 8, 2016, pending.
U.S. Appl. No. 15/342,715, filed Nov. 3, 2016, pending.

* cited by examiner

ILLUMINATION STRUCTURE FOR UNIFORM ILLUMINATION OF KEYS

CROSS-REFERENCE TO RELATED APPLICATIONS

This application is a continuation patent application of U.S. patent application Ser. No. 15/014,596, filed Feb. 3, 2016 and titled "Illumination Structure for Uniform Illumination of Keys," which is a nonprovisional patent application of and claims the benefit of U.S. Provisional Patent Application No. 62/233,975, filed Sep. 28, 2015 and titled "Illumination Structure for Uniform Illumination of Keys," the disclosures of which are hereby incorporated herein by reference in their entireties.

FIELD

Embodiments described herein are directed to input devices for computing systems. More particularly the described embodiments are directed to illumination structures that facilitate substantially uniform illumination of select features of such input devices.

BACKGROUND

Electronic devices can receive user input from a keyboard. The keys of the keyboard may be illuminable and thus visible to a user in dimly-lit environments. A key can be illuminated in a number of ways. For example, a light-emitting diode ("LED") can be disposed behind a keycap of an illuminable key to direct light toward and through a translucent portion of the keycap. In many cases, the location, orientation, and size of such an LED is limited by the structure of the key itself, which, in turn, affects the quality, uniformity, and quantity of light visible to a user.

SUMMARY

Embodiments described herein disclose a keyboard including a group of keys. At least one key of the group of keys includes a compressible dome, a keycap positioned above the compressible dome, a light emitting element, and a light guide positioned at least partially around the compressible dome. The light guide is optically coupled to the light emitting element and includes a light-directing feature operative to direct light from the light emitting element around the light guide, a set of reflection features operative to reflect the light internally around the light guide and a set of illumination features operative to illuminate the keycap.

Also disclosed is an illumination structure for a key of a keyboard. The illumination structure includes a light emitting element, a structural body, and a light guide coupled to the structural body. The light guide includes a set of reflection features operative to reflect the light internally around the light guide. A density of the reflection features may increase from a first location to a second location. The light guide also includes a set of illumination features operative to illuminate at least a portion of a keycap positioned above the illumination structure.

The present disclosure also describes a key for a keyboard. The key includes a keycap disposed within an aperture defined by the keyboard, a compressible dome positioned below the keycap, a key mechanism positioned around the compressible dome and coupled to the keycap and a structural body positioned beneath the key mechanism and formed from an optically translucent material. The structural body is coupled to the key mechanism. The key also includes a light emitting element and a light guide optically coupled to the light emitting element. The light guide includes a first internal feature that is operative to increase an amount of light that is internally reflected (e.g., within the light guide), a second internal feature that is operative to illuminate a hollow interior portion of the structural body, and a third internal feature that is operative to illuminate at least a portion of the keycap.

BRIEF DESCRIPTION OF THE DRAWINGS

Reference will now be made to representative embodiments illustrated in the accompanying figures. It should be understood that the following descriptions are not intended to limit the embodiments to one preferred embodiment. To the contrary, it is intended to cover alternatives, modifications, and equivalents as may be included within the spirit and scope of the described embodiments as defined by the appended claims.

The use of the same or similar reference numerals in different figures indicates similar, related, or identical items.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Embodiments described herein are directed to illumination structures that illuminate one or more keys of a keyboard. An illumination structure may include a light emitting element, such as a light-emitting diode, that is optically coupled to a light guide. The light guide may be positioned below the key to convey light from the light emitting element to an illuminable portion of the key.

As used herein, the phrase "illuminable portion of a key" refers generally to any or all areas of (or adjacent to) a keycap or other input surface of a key that is intended to be illuminated by the light guide such that the location, size, and/or functionality of the key, or a portion of the key, is visually emphasized.

For example, a key may include a glyph that defines an alphanumeric character, a symbol, a word, a phrase, an abbreviation, or any other linguistic, scientific, numeric, or pictographic symbol or set of symbols. The glyph can be formed in, on, or beneath an outer surface of a key and is typically translucent or transparent. In one example, the glyph is illuminated upon activation of the light emitting element. In other examples, other portions of the key associated with the glyph are illuminated upon activation of the light emitting element. Examples include a glyph border, a glyph underline, a glyph outline, and so on.

The geometry of the key may also be an illuminable portion of a key. In one example, the light emitting element illuminates a perimeter of the key. In other examples, other portions of the key are illuminated. These portions may include an external surface of the key, a sidewall of the key, a corner of the key, and so on.

In further examples, the light emitting element can illuminate spaces between one or more keys and the adjacent structure of a keyboard. For example, an aperture in which a key is disposed illuminates upon activation of the light emitting element, thereby generating a halo around a base of the key.

As noted above, the light emitting element is optically coupled to a light guide. In some embodiments, the light guide takes the shape of a ring. In some implementations, the ring can be symmetrical about an axis. In other implementations, the ring can be asymmetrical. Although a ring shape is specifically mentioned, other shapes are contemplated.

The light guide may be formed from an optically translucent (or transparent) material. A body of the light guide can define an inner sidewall, an outer sidewall, a top surface, and a bottom surface. The light emitting element is optically coupled, either directly or indirectly, to a body of the light guide. The surfaces are optically coupled, either directly or indirectly, to the illuminable portions of the key.

In some implementations, the light guide includes various internal features. As used herein, the phrase "internal feature" means a feature that is contained within, or formed on, a body or structure of the light guide that causes light to be internally reflected through the light guide and may also cause the light to illuminate portions of the key. Although internal features are specifically defined as being contained within the body or structure of the light guide, similar features may be provided on an outer surface or structure of the light guide. Using the various internal features described, greater internal reflection may be realized while still providing substantially uniform illumination to the key.

In one example, the light guide includes a light-directing feature that directs light from the light emitting element into a first direction of travel and a second direction of travel. The light guide also includes a set of reflection features that reflect light internally (e.g., into the interior of the light guide). The light guide also includes a set of illumination features that are operative to direct light out of a top surface of the light guide to illuminate the key. One or more sidewalls of the light guide may also include various prisms, serrations, scallops or other such shapes that reflect light into a center portion of the light guide to illuminate a dome switch. Using these various structures, light emitted by the light emitting element travels through the light guide and exits the light guide in a greater quantity and in a more uniform manner. In other embodiments, a light guide, or portions of the light guide, can form a structural portion of the key in addition to directing light.

The light guide also includes one or more internal reflectors such as rectilinear through-holes, laser etched or routed channels, insert-molded reflectors, or the like. The internal reflectors are positioned and oriented to direct light (via internal reflection) within the structural body and/or the light guide. In some cases, the internal reflectors are oriented oblique to a light emitting element. The internal reflectors direct light around structural features of the body that can cause light to undesirably scatter, leak, or exit the body away from the illuminable portion of the key ("light leakage"). In this manner, light emitted by the light emitting element exits the light guide in a greater quantity and in a more uniform manner through the top surface and/or the various sidewalls and thus to the illuminable portion of the key, because less light is lost to leakage.

These and other embodiments are discussed below with reference to FIGS. 1A-6C. However, those skilled in the art will readily appreciate that the detailed description given herein with respect to these Figures is for explanatory purposes only and should not be construed as limiting.

Figure 1A:
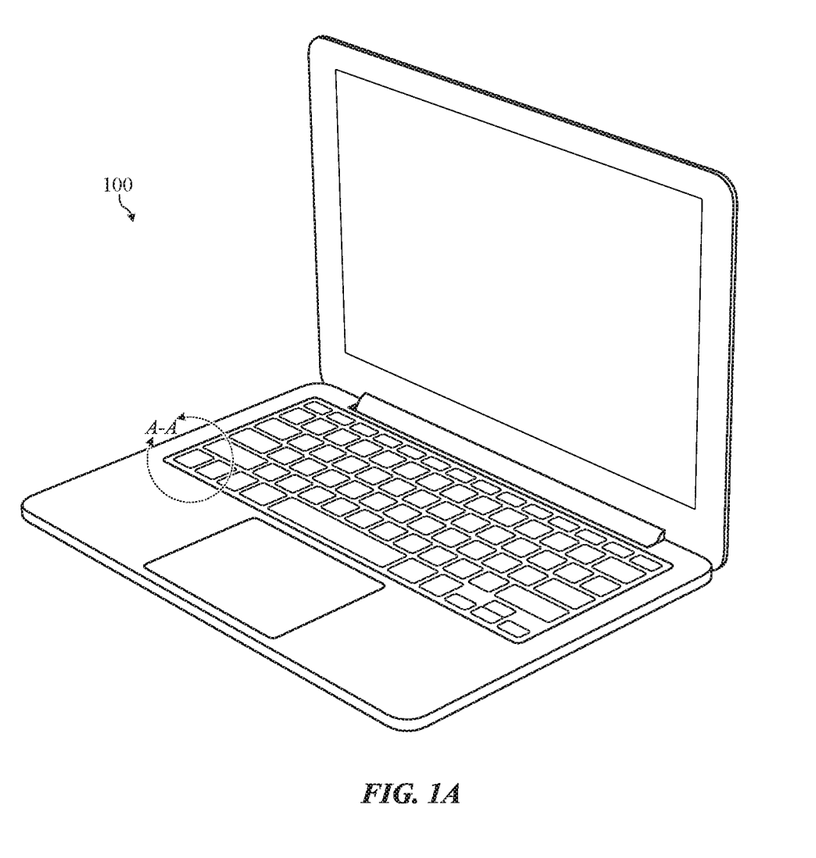
FIG. 1A depicts an electronic device incorporating a keyboard with illuminable keys.
Figure 1B:
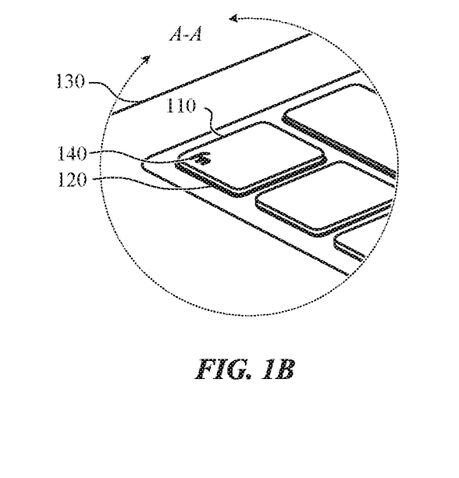
FIG. 1B is an expanded view of the region A-A of FIG. 1A.

FIG. 1A depicts an electronic device 100 incorporating a keyboard with illuminable keys, such as the illuminable key 110 depicted in a removed view of greater scale identified by the enclosed circle A-A, shown in FIGS. 1A-1B.

The electronic device 100 is a portable laptop computer including an integrated keyboard with illuminable keys, such as an illuminable key 110. The illuminable key 110 at least partially extends through an aperture 120 defined in a housing 130 of the electronic device 100. The illuminable key 110 depresses at least partially into the aperture 120 when a user presses the illuminable key 110. In one example, a top surface of the illuminable key 110 is flush with a top surface of the housing 130 of the electronic device 100 when the illuminable key 110 is fully pressed.

A structure associated with the illuminable key 110 is disposed at least partially within the aperture 120. This structure, referred to as a "key stack," can include a keycap, a key mechanism, an elastomeric dome, a switch housing, and electronic switch circuitry. The keycap typically defines at least one illuminable portion, depicted in FIG. 1A as a glyph 140. The glyph 140 can be an alphanumeric character, a symbol, a word, a phrase, an abbreviation, or any other linguistic, scientific, numeric, or pictographic symbol or set of symbols. Further, the glyph 140 can be positioned at various locations on the key 110. In addition, a single key 110 may include a single glyph 140 or multiple glyphs 140.

Figure 2A:
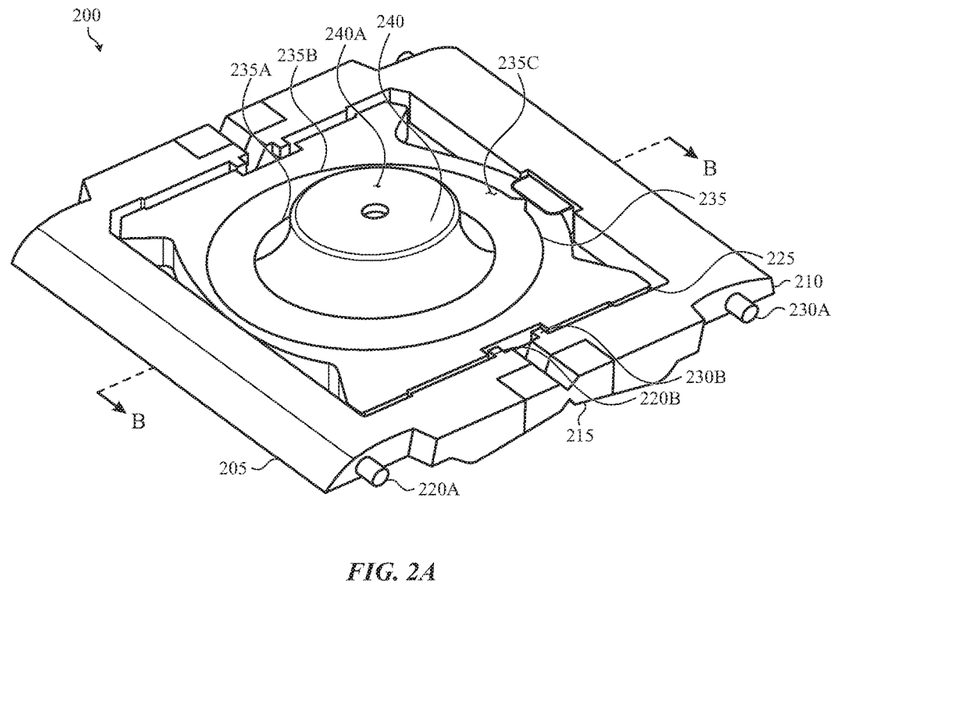
FIG. 2A depicts an example key mechanism that may be used with an illuminable key of the keyboard shown in FIGS. 1A-1B.

FIG. 2A depicts an example key mechanism 200 that may be used with an illuminable key of the keyboard shown in FIGS. 1A-1B. The key mechanism 200 is depicted in a depressed configuration (e.g., the key is pressed by a user).

The key mechanism 200 may have a first wing 205 and a second wing 210 that are coupled together with a hinge 215. The first wing 205 and the second wing 210 are substantially symmetric across the hinge 215. For example, the first wing 205 and the second wing 210 may be formed in a U-shape such as shown although this is not required. The free ends of the first wing 205 and the second wing 210 may be coupled by the hinge 215 to form a closed ring.

In many cases, the hinge 215 is a living hinge formed from a flexible material such as a polymer or elastomer. In other cases, the hinge 215 is a flexible member overmolded onto the first wing 205 and the second wing 210. The flexible member can be formed from metal, fabric, a polymer, or the like. In other embodiments, the first wing 205 and the second wing 210 can be formed from an optically translucent or transparent material and can be optically coupled to a light emitting element. In this manner, the first wing 205 and the second wing 210 can serve as a portion of a light guide.

Although a single hinge 215 in shown, the key mechanism 200 may include multiple hinges. For example, as shown in FIG. 2A, the first wing 205 and the second wing 210 are joined by two hinges 215 that are positioned opposite each other.

The first wing 205 and the second wing 210 are typically formed from the same material, although this is not required. For example, in one embodiment, the first wing 205 is formed from a plastic material doped with glass fibers and the second wing 210 is formed from metal. In other embodiments, both the first wing 205 and the second wing 210 are formed from a doped plastic material. In one embodiment, the doped plastic material can be selected to increase the strength and/or rigidity of the first wing 205 and the second wing 210.

Both the first wing 205 and the second wing 210 include geometry configured to interlock with one or more other structural portions of the key mechanism 200. For example, the first wing 205 may include a keycap pivot 220A (or other interlocking feature) that interlocks with and/or slides within a portion of a keycap (not shown) positioned above the key mechanism 200. The first wing 205 also includes a structural pivot 220B (or other interlocking feature) that interlocks with and/or slides within a portion of a structural body 225 of the key mechanism 200. Similarly, the second wing 210 includes a keycap pivot 230A that interlocks with and/or slides within a portion of the keycap. The second wing 210 also includes a structural pivot 230B that interlocks with and/or slides within a portion of the structural body 225.

The structural body 225 is formed from a rigid material such as plastic or metal. As with the first wing 205 and the second wing 210, the structural body 225 can be formed from a doped material. The structural body 225 can also be formed from an optically transparent or translucent material although this is not required. In one example, the structural body 225 can be formed from an optically opaque material. In other examples, the structural body 225 can be formed from a translucent material that takes a particular color.

A light guide 235 is positioned on or within the structural body 225. The light guide 235 may be shaped as a ring although such a configuration is not required. For example, the light guide 235 can take a square shape, a rectangular shape, a grid shape, an asymmetrical shape or any other shape or combination of shapes. In still further examples, the light guide 235 may be formed as a segmented shape, such as a segmented ring.

The light guide 235 is formed from an optically translucent or transparent material such as acrylic, glass, or plastic. In many examples, the light guide 235 is insert-molded into the structural body 225. In other embodiments, the light guide 235 is co-molded with the structural body 225. In still further examples, the light guide 235 is molded into a light guide cavity that is defined within the structural body 225. In another implementation, the light guide 235 may be formed as a separate piece and may be joined or otherwise coupled to the structural body 225.

The light guide 235 includes a body that defines an inner sidewall 235A, an outer sidewall 235B, a top surface 235C, and a bottom surface (not visible in FIG. 2A). In some embodiments, one or both of the inner sidewall 235A and the outer sidewall 235B may include one or more internal features that direct and/or reflect light. The top surface 235C and/or the bottom surface may also include one or more internal features that direct and/or reflect light.

For example, one or both of the inner sidewall 235A and the outer sidewall 235B may include a set of reflection features that reflect light internally around the light guide 235. The inner sidewall 235A may also include a set of features that illuminate a compressible dome 240 positioned in a center of the key mechanism 200.

One or more of the top surface 235C and the bottom surface may also include a set of illumination features that illuminate a keycap or portions of the keycap. For example, a bottom surface of the light guide 235 may have one or more internal features that reflect light into a glyph on a keycap. Although the above features are described as being internal features, one or more of these features may be provided on an outer surface of the light guide 235.

In some embodiments, and as a result of the features described above, each of the inner sidewall 235A and the outer sidewall 235B of the light guide 235 may exhibit greater internal reflection than the top surface 235C and the bottom surface of the light guide 235. In this manner, light emitted into the light guide 235 by a light emitting element will exit the light guide 235 in a greater quantity and in a more uniform manner through the top surface 235C than through any other portion of the light guide 235. In some examples, the top surface 235C is optically diffusive.

The light guide 235 is optically coupled, either directly or indirectly, to one or more illuminable portions of the key. In one example, the light guide 235 is optically coupled to the glyph 140 of the illuminable key 110 depicted in FIGS. 1A-1B. With respect to the orientation shown in FIG. 1B, the light guide 235 reflects light toward the bottom left hand portion of the illuminable key 110. For example, in place of a ring configuration such as depicted in FIG. 2A, the top surface 235C of the light guide 235 can take a circular shape, positioned in the leftmost corner of the structural body 225 so that the top surface 235C is positioned substantially below the glyph 140 of the illuminable key 110 depicted in FIGS. 1A-1B. For other glyphs 140 taking other shapes, the light guide 235 can take a different shape. In this manner, the shape and size of the light guide 235 is selected based on the geometry of the illuminable portion to which the light guide 235 is optically coupled.

In another embodiment, the light guide 235, or one or more surfaces of the light guide 235, may include one or more internal features that direct light to the illuminable portion of the illuminable key 110. For example, one or more surfaces of the light guide 235 may include various cut-out features that direct light to the illuminable portion such as, for example, the glyph 140. In such embodiments, the cut-out feature may be offset from the illuminable portion. In another embodiment, the cut-out feature may be below the illuminable portion. In still yet other embodiments, the cut-out feature may be integrated with or otherwise be formed with the other internal features of the light guide 235 described above.

The light guide 235 may be disposed around a through-hole, an aperture or other hollow interior portion defined by the structural body 225. The through-hole may be circular, rounded, curved although this is not required and the through-hole can take other shapes.

The key mechanism 200 may also include a compressible dome 240. The compressible dome 240 is disposed within the through-hole. In some embodiments, the compressible dome 240 is formed from an elastomeric material although other materials may be used. The compressible dome 240 may be formed from a transparent or translucent material. For example, the compressible dome 240 is formed from an optically opaque material. In other examples, the compressible dome 240 is formed from an optically translucent material of a particular color (e.g., white). In this way, the compressible dome 240, or portions of the compressible dome 240, may be illuminated by the internal features of the light guide 235.

In some embodiments, the compressible dome 240 extends a certain distance above a top surface of the structural body 225. In other embodiments, the compressible dome 240 is flush with a top surface of the structural body 225.

In many embodiments, a top surface 240A the compressible dome 240 interfaces with the underside of the keycap (not shown) of the illuminable key. In one example, the underside of the keycap includes a projection that contacts the top surface 240A of the compressible dome 240. In other cases, the underside of the keycap can include an indentation that receives the top surface 240A of the compressible dome 240. The compressible dome 240 collapses into the through-hole to activate electronic switch circuitry associated with the illuminable key in response to a user pressing the keycap. In embodiments wherein the internal features of the light guide 235 illuminate the compressible dome 240, light from the light guide may illuminate the top surface 240A of the compressible dome 240 as well as one or more glyphs on the keycap.

As discussed above, the key mechanism 200 is depicted in FIGS. 2A-2B in a depressed configuration (e.g., when the key is pressed by a user). As such, the first wing 205 and the second wing 210 are fully extended. When the key mechanism 200 is in its nominal state, the outermost portions of the first wing 205 and the second wing 210 extend above the structural body 225. The first wing 205 and the second wing 210 also pivot relative to one another and relative to the structural body 225 at the hinge 215.

Figure 2B:
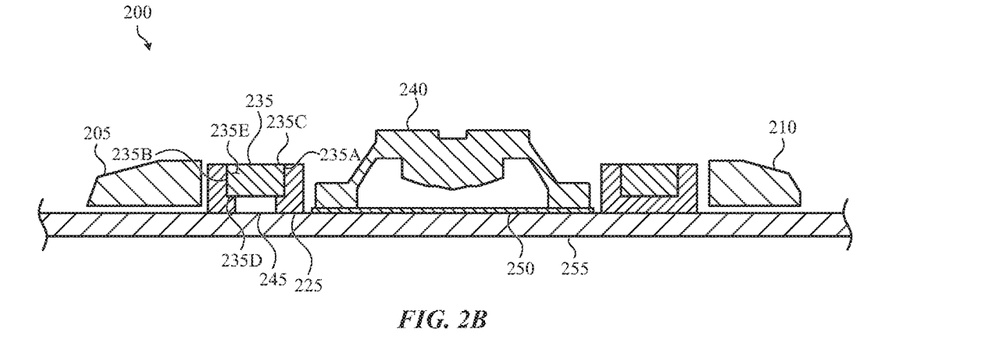
FIG. 2B depicts a cross-section view of the key mechanism of FIG. 2A taken along line B-B of FIG. 2A.

FIG. 2B depicts a cross-section view of the key mechanism of FIG. 2A taken along line B-B of FIG. 2A. As depicted in FIG. 2A, the first wing 205 and the second wing 210, when coupled by the hinge(s), define an internal area in which the structural body 225 is positioned. The light guide 235 is disposed within a portion of the structural body 225. As illustrated, the top surface 235C of the light guide 235 is substantially flush with a top surface of the structural body 225, although such a configuration is not required. For example, in some embodiments, the top surface 235C extends proud of a top surface of the structural body 225. In other examples, the top surface 235C is inset into the structural body 225.

In some embodiments, the light guide 235 extends partially, but not entirely, through the structural body 225. More particularly, a bottom surface 235D of the light guide 235 mates with an internal portion of the structural body 225. In other embodiments, the bottom surface 235D can extend through the entire depth of the structural body 225.

Although the bottom surface 235D is illustrated as substantially parallel to the top surface 235C, such a configuration is not required. For example, the bottom surface 235D can be oblique to the top surface 235C.

As noted above, the light guide 235 can include a body 235E. The body 235E is optically coupled, either directly or indirectly, to a light emitting element 245. The body 235E may be optically coupled to the light emitting element 245 through the bottom surface 235D of the light guide 235. In other embodiments, the light emitting element 245 can be optically coupled to the light guide 235 at a different location. In other examples, the light emitting element 245 can be optically coupled to the light guide 235 indirectly, such as via a light pipe.

The light emitting element 245 includes one or more light-emitting diodes. The light-emitting diodes emit light of a particular color and at a particular brightness. In some embodiments, the light emitting element 245 provides light of a variable color or a variable brightness. In one example, the light emitting element 245 emits white light having a cool color temperature, although this is not required.

An electrical switch layer 250 is also depicted in FIG. 2B. The electrical switch layer 250 is disposed below the compressible dome 240 such that an electrical property of the electrical switch layer 250 changes when the compressible dome 240 compresses or contacts the electrical switch layer 250. In one example, the compressible dome 240 completes an electrical contact between electrical traces or contacts disposed on the electrical switch layer 250 when the compressible dome 240 is compressed. The electrical traces may be organized in an interleaved comb pattern or a concentric circular pattern. In other embodiments, the compressible dome 240 can cause a change in a capacitance measured between one or more portions of the electrical switch layer 250.

In some implementations, the key mechanism 200 is disposed on a substrate 255. The substrate 255 can be positioned within a housing of an electronic device, such as the electronic device 100 depicted in FIGS. 1A-1B. In other embodiments, the substrate 255 can be positioned within an aperture defined by the housing of an electronic device 100. In one example, the substrate 255 is formed from a rigid material such as metal or plastic.

As noted with respect to other embodiments described herein, the inner sidewall 235A and the outer sidewall 235B of the light guide 235 exhibit greater internal reflection than the top surface 235C and the bottom surface 235D. More particularly, the internal reflection of light vectored toward a sidewall of the light guide 235 may be greater than the internal reflection of light vectored toward a surface of the light guide. For example, the sidewalls of the light guide 235 may be more optically reflective than the top and bottom surfaces of the light guide 235.

As may be appreciated, the reflectivity of a surface may depend upon the angle of incidence with which light strikes the surface and the difference between the refractive indices of the materials interfacing at the surface. More specifically, at the boundary between the light guide 235 and another material (e.g., air, the structural body 225, the keycap, and so on) having a lower refractive index than that of the light guide 235, light within the light guide 235 may be reflected internally. If the angle of incidence of the light is sufficiently high, total internal reflection may occur (e.g., almost zero light passes through the boundary and effectively all light reflects back into the body 235E). Thus, in some cases, the inner sidewall 235A and the outer sidewall 235B can exhibit total internal reflection. In some embodiments, the bottom surface 235D may also exhibit greater internal reflection than the top surface 235C.

For these embodiments, most of the light emitted into the light guide 235 by the light emitting element 245 will either reflect off the inner sidewall 235A and/or the outer sidewall 235B (and/or the bottom surface 235D), or will exit the light guide 235 through the top surface 235C. However, and as will be discussed below, the inner sidewall 235A may include various internal features that enable the light to illuminate the dome 240.

As discussed above, internal reflection of light can cause light to be reflected or emitted in a substantially uniform manner across the entire surface of the top surface 235C. More specifically, the portion of the top surface 235C that is diametrically opposite the light emitting element 245 (e.g., the point that is farthest away from the light emitting element 245) can emit a quantity of light substantially similar to the other portions of the top surface 235C. In this manner, the light guide 235 facilitates substantially uniform emission of light from its body 235E.

As a result, the illuminable portions of the key to which the light guide 235 is optically coupled (either directly or indirectly) are illuminated in a substantially uniform manner.

Figure 3:
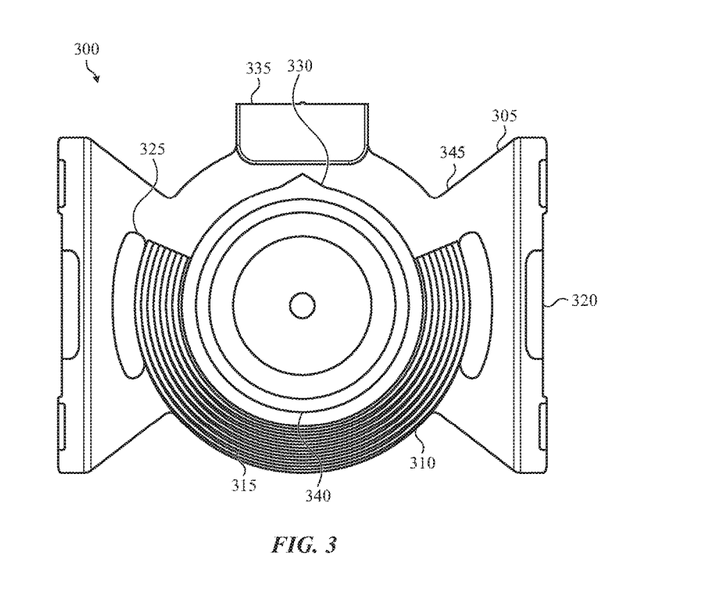
FIG. 3 illustrates an example illumination structure having a first configuration.

FIG. 3 illustrates an example illumination structure 300 having a first configuration. The illumination structure 300 may be used as part of a key mechanism such as, for example key mechanism 200 shown and described above with respect to FIGS. 2A-2B.

The illumination structure 300 may have a structural body 305 and a light guide 310 such as described above. For example, the light guide 310 may be rounded, curved or have any other shape. The structural body 305 may have or otherwise define a hollow interior portion. The light guide 310 may be adjacent to or otherwise surround the hollow interior portion.

The light guide 310 may include one or more internal features 315. The internal features 315 may be positioned on a bottom surface of the light guide 310, a top surface of the light guide 310, an inner side wall of the light guide 310 and/or and outer sidewall of the light guide 310. More specifically, the light guide 310 may include a number of different internal features 315. Further, different internal features may be positioned on different surfaces of the light guide 310.

For example, a first type of internal feature may be a reflection feature that causes light to be reflected internally around the light guide 310. More specifically, the first type of internal feature may be one or more lenticular structures. The lenticular structures may include dome shaped features, lens shaped features and other such structures that may be used to pull or otherwise reflect light around the light guide 310. The lenticular structures may be positioned on a bottom surface of the light guide 310, a top surface of the light guide and/or one or more sidewalls of the light guide 310.

The lenticular structures, as well as other internal features described herein, may be arranged in a number of different orientations and patterns. In addition, a density of the lenticular structures may increase from a first portion of the light guide 310 to a second portion of the light guide 310. For example, and as shown by the shading in FIG. 3 (and as also shown by the shading in FIGS. 4-5) the density of the lenticular structures may be less near a light emitting element 335 and gradually become greater the farther away the structures are from the light emitting element 335. In other implementations, the density of the lenticular structures may be greater near the light emitting element 335 and less the farther away from the light emitting element 335. In yet another implementation, the density of the lenticular structures may remain constant or substantially constant.

As light travels around the light guide 310, some of the light may be lost to light leakage. In addition, some of the light may be extracted by other internal features and used to illuminate portions of the key such as will be described in more detail below. Accordingly, increasing the density of the some of the internal features, such as the lenticular structures, helps compensate for the light that is lost which helps provide more uniform illumination. For example, as the absolute amount of light within the light guide 310 decreases, the high density internal features extract a greater percentage of available light thereby providing more uniform illumination around the light guide 310.

The light guide 310 may also include a second type of internal feature 315. Like the first type of internal feature 315, the density of the second type of internal feature 315 may increase, decrease or stay substantially the same as the distance from the light emitting element 335 increases.

The second type of internal feature 315 may be a sidewall feature that allows light to escape the light guide 310 and illuminate the hollow interior portion of the structural body 305. The sidewall feature may also illuminate a dome 340 that is positioned within the hollow interior portion. In some embodiments, the sidewall feature may be disposed on an inner sidewall of the light guide 310 and/or an outer sidewall of the light guide 310 although this is not required. In addition, the sidewall feature may be provided on an external sidewall of the light guide 310.

The second type of internal feature 315 may consist of a repeating pattern of prisms. In some embodiments, the prisms may be triangular or may have a sawtooth (e.g., serrated) shape although other shapes are contemplated.

The dimensions of each of the prisms may vary. In addition, and as with the other internal features described herein, a geometry of the prisms disposed on the sidewalls can be determined or approximated, at least in part, based on the refractive index of the material selected for the light guide.

The light guide 310 may also include a third type of internal feature 315 that is operative to illuminate a keycap positioned above the illumination structure 300. For example, the third type of internal feature 315 may be an illumination feature or a light extraction feature that is operative to illuminate the keycap, one or more glyphs on the keycap, a border surrounding or adjacent the keycap and the like.

For example, the illumination feature may be operative to direct light through the top surface of the light guide 310 and into the keycap. More specifically, the illumination feature causes light from the light emitting element 335 to exit the top surface of the light guide 310 and illuminate the keycap.

In some implementations, a density of the illumination features may change depending on the position of the illumination features with respect to the light emitting element 335. In addition, the illumination feature may be interspersed with the other internal features described above. For example, the light guide 310 or one or more surfaces of the light guide 310 may have a set of internal reflection features interspersed with the illumination features. In other implementations, the light guide 310 may be made of or otherwise include a number of different layers. In such cases, each layer may have one or more of the various internal features 315 described above.

The light guide 310 may also include a light-directing feature 330 and a light emitting element 335. The light guide 310 may be optically coupled, either directly or indirectly, to the light emitting element 335. The light emitting element 335 is positioned to emit light into the light guide 310. In some cases, the light emitting element 335 may emit light directly into a sidewall (e.g., outer sidewall) of the light guide 310. In other embodiments, the light emitting element 335 is coupled to a bottom surface of the light guide 310. In still other embodiments, the light emitting element 335 is optically coupled to both the top and bottom surfaces of the light guide 310. Regardless of where the light emitting element 335 is positioned, one or more light-directing feature 330 can be formed within the structural body 305 to direct light emitted from the light emitting element 335 in a particular direction.

In some embodiments, the light-directing feature 330 may be positioned within the light guide 310 and/or on an outer surface of the light guide 310 near or otherwise adjacent the light emitting element 335. The light-directing feature 330 directs light from the light emitting element 335 down one or more paths of the light guide 310.

For example, in this particular embodiment, the light-directing feature 330 may reflect light down the right side of the light guide 310 and the left side of the light guide 310 in order to increase the uniformity of light throughout the light guide 310. The light-directing feature 330 may include one or more structures that may be used to reflect or direct light. In one non-limiting example, the light-directing feature 330 includes one or more Fresnel lenses. Although Fresnel lenses are specifically mentioned, other lenses and/or light-directing surfaces may be used. For example, in some embodiments, the light-directing feature 330 can be implemented as a chamfer formed in the inner sidewall of the light guide 310. In other embodiments, the light-directing feature 330 is a non-flat surface such as a convex surface, a concave surface, or a domed surface. In some other non-limiting examples, the light-directing feature 330 can also be coated with a reflective coating or material such as a metalized ink.

The light-directing feature 330 may have a number of different orientations. For example, the light-directing feature 330 may be angled toward a top surface of the light guide 310. In another embodiment, the light-directing feature may be angled toward one or more sidewalls of the light guide 310. The angle of the light-directing feature 330 can be selected, at least in part, to increase or maximize the internal reflection of light emitting from the light emitting element 335.

The structural body 305 may also include a number of ribs 345 that extend from the light guide 310. The ribs 345 are placed at locations around the light guide 310 and are used to increase the amount of light that is internally reflected. For example, the ribs 345 may be placed at certain areas around the light guide 310 that are more permeable to light than other areas. In some embodiments, the ribs 345 are placed at locations in the light guide 310 with a low density of internal features 315.

The ribs 345 are coupled to or are otherwise formed with an attachment mechanism 320. The attachment mechanism 320 may be used to couple a structural pivot of a hinge (e.g., structural pivot 220B and structural pivot 230B) to the illumination structure 300. In this arrangement, the illumination structure 300 may have a bowtie configuration. Although a bowtie configuration is specifically mentioned, other configurations are contemplated and described in more detail below.

The illumination structure 300 also includes one or more reflective features 325. The reflective features 325 may be implemented as a through-hole, a laser etched or routed channel, an insert molded reflector, or the like. The reflective features 325 may be positioned adjacent to the light guide 310 and oriented to direct light (via internal reflection) within the body of the light guide 310. More specifically, the reflective features 325 may be implemented as apertures (filled or open) through the body of the light guide 310. In this manner, the reflective features 325 introduce a refractive index mismatch between the material of the body of the light guide 310 and air within the aperture, thereby increasing the quantity of light within the body of the light guide 310 that is subject to internal reflection and decrease the quantity of light within the body of the light guide 310 that is subject to transmission into the reflective feature 325. Accordingly, as the light hits the reflective features 325, the refractive index of the reflective features 325 causes light to be reflected into the light guide 310. Although two reflective features 325 are shown, the illumination structure 300 may include any number of reflective features 325 positioned at various locations around the light guide 310.

Figure 4:
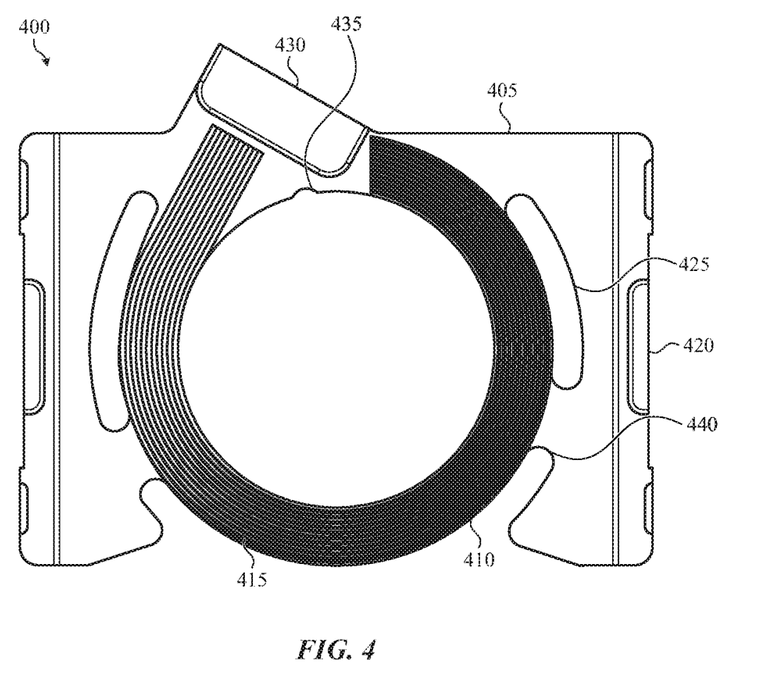
FIG. 4 illustrates an example illumination structure having a second configuration.

FIG. 4 illustrates an example illumination structure 400 having a second configuration. The illumination structure 400 may be used as part of a key mechanism such as, for example, key mechanism 200 shown and described above with respect to FIGS. 2A-2B.

Like the illumination structure 300 described above with respect to FIG. 3, the illumination structure 400 includes a structural body 405, a light guide 410 and one or more internal feature 415. Each of the structural body 405, the light guide 410 and the internal features may be similar to those described above with respect to FIG. 3. For example, the light guide 410 may be rounded or otherwise curved, may surround, be adjacent to or otherwise define a hollow interior portion and may have various internal features 415. The internal features 415 act to reflect light internally, illuminate a keycap positioned above the illumination structure 400 and reflect light into or otherwise illuminate the hollow interior portion and/or a dome (not shown) positioned in the center of the illumination structure 400. Further, a density of the internal features 415 may increase from a first area in the light guide 410 (e.g. near the light emitting element 430) to a second area in the light guide 410 and as illustrated by the shading shown in FIG. 4.

However, unlike the light guide 310 described with respect to FIG. 3, the light guide 410 is shaped as a helix. More specifically, a first side of the light guide 410 is optically coupled to a light emitting element 430. The light emitting element 430 is oriented to emit light through the light guide 410 from the first side to a second side. For example, a set of internal features 415 within the light guide 410 operate to reflect light internally and illuminate portions of a keycap and/or a dome such as described above.

In addition, the illumination structure 400 may include a light-directing feature 435 operative to direct light through the first path. Because the light guide 410 is shaped as a helix and the light emitting element 430 emits light into a first path of the light guide, the light-directing feature 435 may not need to direct as much light down two different paths of a light guide and, as a result, may be smaller when compared to the light-directing feature 330 described above.

The illumination structure 400 also includes one or more ribs 440 that are coupled to the light guide 410. The ribs 440 act to increase the amount of light that is internally reflected such as described above. The ribs 440 are also coupled to one or more attachment mechanisms 420 that interact with a hinge of a key mechanism. The structural body 405 may also include one or more reflective features 425. The reflective features 425 may be adjacent the light guide 410 and act in a similar manner as the reflective features 325 described above.

Although the structural body 405 is shown in FIG. 4 as having a generally rectangular shape, this shape is not required. For example, the structural body 405 may be in any shape including a circular shape, a square shape, a bowtie shape and so on.

Figure 5:
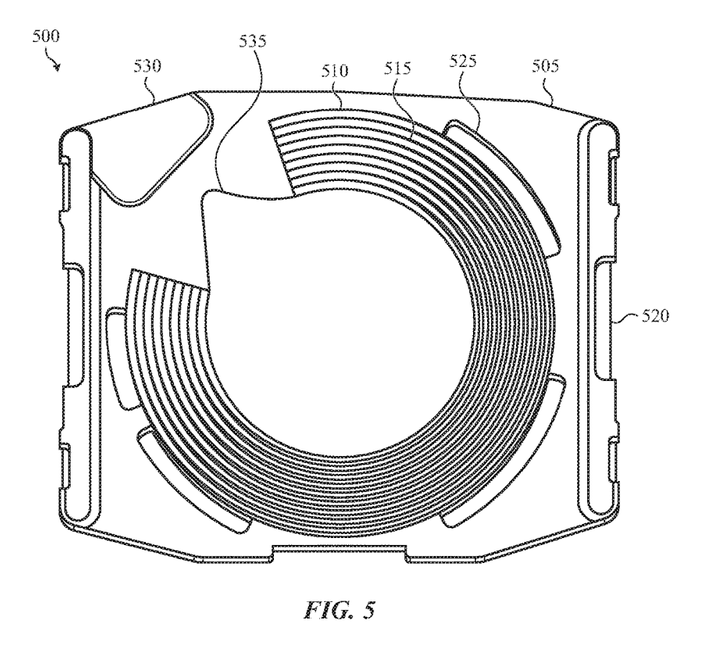
FIG. 5 illustrates an example illumination structure having a third configuration.

FIG. 5 illustrates an example illumination structure 500 having a third configuration. The illumination structure 500 may be used as part of a key mechanism such as, for example, key mechanism 200 shown and described above with respect to FIGS. 2A-2B.

Like the previously described illumination structures, the illumination structure 500 includes a structural body 505, a light guide 510 and one or more internal features 515. The light guide 510 may be adjacent to or otherwise define a hollow interior portion. Each of these components operates in similar manner such as described above.

The illumination structure 500 also includes a light emitting element 530 and a light-directing feature 535. However, in this implementation, the light emitting element 530 and the light-directing feature 535 are positioned in a corner of the structural body 505. Although the light emitting element 530 and the light-directing feature 535 are positioned in a corner of the structural body 505, each of these components function in a similar manner as the light emitting element 335 and light-directing feature 330 described above with respect to FIG. 3.

The illumination structure 500 also includes one or more attachment mechanisms 520 that interact with a hinge of a key mechanism. The structural body 505 may also include one or more reflective features 525. The reflective features 525 may be adjacent the light guide 510 and act to increase the amount of light that is internally reflected such as described above.

Although the structural body 505 is shown in FIG. 5 as having a generally rectangular shape, this shape is not required. For example, the structural body 505 may have any cross-sectional shape, including a circular shape, a parallelepiped shape, a bowtie shape and so on.

Figure 6A:
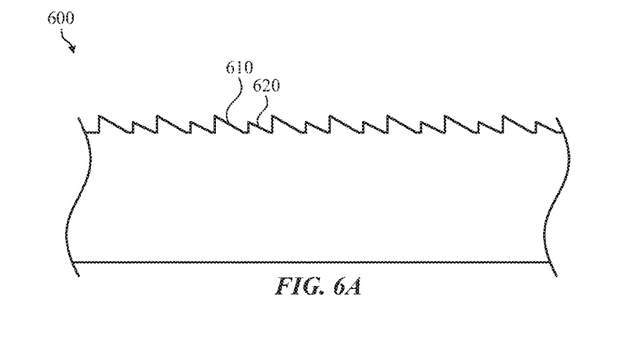
FIG. 6A illustrates various internal features that may be used in an example illumination structure.

FIG. 6A illustrates various internal features 600 that may be used in an example illumination structure such as, for example, the various illumination structures described above with respect to FIGS. 3-5.

The internal features 600 may include one or more prisms such as, for example, a first prism 610 and a second prism 620. In some embodiments, the dimensions of the first prism 610 and the second prism 620 may vary. In other embodiments, the number of each of the prisms 610 and 620 may vary. In still yet other embodiments, the shape of the first prism 610 and the second prism 620 may also vary. For example, the first prism 610 may be rounded or scalloped while the second prism 620 has a triangular shape, a concave portion, and so on.

Due to the varying dimensions of the first prism 610 and the second prism 620, each prism may be operative to interact with light in a different manner. For example, the first prism 610 may be used to direct light in a first direction while the second prism 620 may be used to direct light in a second direction.

Figure 6B:
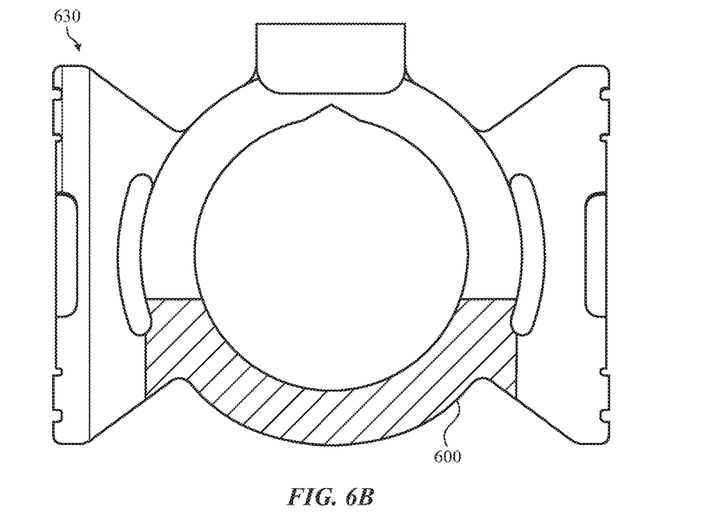
FIG. 6B illustrates an example placement of the internal features of FIG. 6A on an illumination structure.

More specifically, the first prism 610 may be used to direct light to one more glyphs on a keycap while the second prism 620 may be used to reflect light internally through a light guide. In some implementations, the internal feature 600 may be placed on specific areas of a light guide. For example and as shown in FIG. 6B, the internal features 600 may be placed on a particular portion and/or a surface of an illumination structure 630. More specifically, one or more internal features 600 may be locally patterned on a surface of the illumination structure 630 based on, for example, the placement of glyphs on a keycap.

Figure 6C:
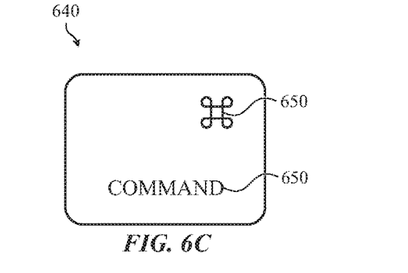
FIG. 6C illustrates an example keycap for a key that may be illuminated using the illumination structure of FIG. 6B.

For example and turning to FIG. 6C, a keycap 640 may have one or more glyphs 650 placed on different areas. In such implementations, the internal features described above with respect to FIGS. 3-5 may not uniformly illuminate these glyphs 650 as they are not centered on the keycap 640. As such, and as shown in FIG. 6B, one or more internal features 600 may be provided on various parts of the illumination structure 630 in order to better illuminate these glyphs.

In one particular implementation, the internal features 600 may be offset from the glyph 650 of the keycap. For example, the glyph 650 may be positioned at a first location on the keycap while the internal features 600 are positioned on an illumination structure 630 at a position that is offset (e.g., not directly below) the glyph 650. Although the positions of the glyph 650 and the internal features 600 may be offset with respect to one another, the shape, dimensions and/or orientation of one or more of the internal features 600 direct light to the glyph 650 to illuminate it.

Although the internal features 600 are shown on a particular portion of the illumination structure 630, the internal features 600 may be placed on multiple different portions or locations on the illumination structure 630. Thus, an illumination structure 630 may be customized based on the type of glyphs and the location of glyphs on a keycap associated with the illumination structure 630.

Although many embodiments described and depicted herein reference light guides for illuminable keys of a keyboard, it should be appreciated that other implementations can take other form factors. Thus, the various embodiments described herein, as well as functionality, operation, components, and capabilities thereof may be combined with other elements as necessary, and so any physical, functional, or operational discussion of any element or feature is not intended to be limited solely to a particular embodiment to the exclusion of others.

For example, although the electronic device 100 is shown in FIGS. 1A-1B as a laptop computer, it may be appreciated that other electronic devices are contemplated. For example, the electronic device 100 can be implemented as a peripheral input device, a desktop computing device, a handheld input device, a tablet computing device, a cellular phone, a wearable device, and so on.

Further, it may be appreciated that the electronic device 100 can include one or more components that interface or interoperate, either directly or indirectly, with the illuminable key 110 which, for simplicity of illustration are not depicted in FIGS. 1A-1B. For example, the electronic device 100 may include a processor coupled to or in communication with a memory, a power supply, one or more sensors, one or more communication interfaces, and one or more input/output devices such as a display, a speaker, a rotary input device, a microphone, an on/off button, a mute button, a biometric sensor, a camera, a force and/or touch sensitive trackpad, and so on.

In some embodiments, the communication interfaces provide electronic communications between the electronic device 100 and an external communication network, device or platform. The communication interfaces can be implemented as wireless interfaces, Bluetooth interfaces, universal serial bus interfaces, Wi-Fi interfaces, TCP/IP interfaces, network communications interfaces, or any conventional communication interfaces. The electronic device 100 may provide information related to externally connected or communicating devices and/or software executing on such devices, messages, video, operating commands, and so forth (and may receive any of the foregoing from an external device), in addition to communications. As noted above, for simplicity of illustration, the electronic device 100 is depicted in FIGS. 1A-1B without many of these elements, each of which may be included, partially, optionally, or entirely, within a housing 130.

In some embodiments, the housing 130 can be configured to, at least partially, surround a display. In many examples, the display may incorporate an input device configured to receive touch input, force input, and the like and/or may be configured to output information to a user. The display can be implemented with any suitable technology, including, but not limited to, a multi-touch or multi-force sensing touchscreen that uses liquid crystal display (LCD) technology, light-emitting diode (LED) technology, organic light-emitting display (OLED) technology, organic electroluminescence (OEL) technology, or another type of display technology. In other implementations, the light source, such as, for example, light emitting element 335, may be used as a backlight for a display.

The housing 130 can form an outer surface or partial outer surface and protective case for the internal components of the electronic device 100. In the illustrated embodiment, the housing 130 is formed in a substantially rectangular shape, although this configuration is not required. The housing 130 can be formed of one or more components operably connected together, such as a front piece and a back piece or a top clamshell and a bottom clamshell. Alternatively, the housing 130 can be formed of a single piece (e.g., uniform body or unibody).

Various embodiments described herein can be incorporated with other systems or apparatuses and may not, in all cases, be directly associated with an input device configured for use with an electronic device such as depicted in FIGS. 1A-1B. For example, a light guide as described herein can be incorporated into an independent electronic switch such as a button (e.g., light switch, automotive button, doorbell, and so on). In other examples, a light guide as described herein can be incorporated into a different portion of an electronic device, such as a display element of an electronic device. In such an example, a light guide incorporating prismatic or scalloped sidewalls can be used as a backlight diffuser within a display stack.

Additionally, it may be appreciated, that for illuminable key embodiments, the various structures and mechanisms described herein are not intended to limit the disclosure to a particular favored or required geometry or form factor. For example, an illuminable key can include a butterfly mechanism, a scissor mechanism, or any other suitable type of key mechanism.

An illuminable key can include a keycap that is formed to have a substantially flat top surface or, in other embodiments, to have a partially curved top surface. An electronic switch associated with the illuminable key can be implemented as a single throw switch, a multi-throw switch, a capacitive switch, and so on. A tactile feedback structure associated with the illuminable key can be implemented as an elastomeric dome, a spring, an elastomer deposit, a metal dome, or any combination thereof.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. A keyboard comprising:
 a keyboard base; and
 a set of keys coupled to the keyboard base, one of the keys of the set of keys comprising:
  a switch body formed at least partially from a light transmissive material and comprising:
   an opening in a central region of the switch body configured to receive at least part of a dome switch; and
   an attachment feature positioned along a side of the switch body;
  a hinge mechanism coupled to the switch body via the attachment feature;
  a keycap coupled to the hinge mechanism; and
  a light source configured to couple light to the keycap via the switch body.

2. The keyboard of claim 1, wherein:
 the switch body further comprises a recess; and
 the light source is positioned at least partially in the recess.

3. The keyboard of claim 1, wherein the hinge mechanism comprises:
 a first wing;
 a second wing opposite the first wing; and
 a living hinge coupling the first wing to the second wing.

4. The keyboard of claim 3, wherein:
 the first and second wings each comprise a pivot member; and
 the pivot members interlock with the attachment feature to retain the hinge mechanism to the switch body.

5. The keyboard of claim 1, wherein the light transmissive material is a transparent plastic.

6. The keyboard of claim 1, wherein the switch body further comprises a lens configured to direct light out of the switch body.

7. The keyboard of claim 1, wherein:
 the keycap comprises a glyph; and
 the light source is configured to couple the light to the glyph.

8. A key for a keyboard, comprising:
 a light emitting element;
 a keycap;
 a light transmissive body configured to receive light from the light emitting element and direct the light towards the keycap;
 a keycap support mechanism movably coupling the keycap to the light transmissive body; and
 a collapsible dome within an opening in the light transmissive body.

9. The key of claim 8, wherein a top surface of the collapsible dome is substantially flush with a top surface of the light transmissive body.

10. The key of claim 9, wherein the collapsible dome is a metal dome.

11. The key of claim 10, wherein the collapsible dome provides tactile feedback to the keycap when the keycap is actuated.

12. The key of claim 8, wherein:
 the light transmissive body comprises an attachment feature; and the keycap support mechanism is pivotally coupled to the light transmissive body via the attachment feature.

13. The key of claim 12, wherein the keycap is pivotally coupled to the keycap support mechanism.

14. The key of claim 8, wherein the light emitting element emits light into the light transmissive body through a side surface of the light transmissive body.

15. A switch body for a key of a keyboard, comprising:
a body formed from a light transmissive material and defining:
a top surface;
a bottom surface opposite the top surface;
an opening extending completely through the body from the top surface to the bottom surface and configured to receive a collapsible dome therein; and
a recess along a side of the body and configured to receive a light source therein; wherein
the body is configured to direct light from the light source out of the top surface of the body.

16. The switch body of claim 15, further comprising an attachment feature formed in the side of the body and configured to couple to a pivot member of a keycap support mechanism.

17. The switch body of claim 16, wherein the attachment feature is a recess.

18. The switch body of claim 17, wherein the recess is dimensioned to allow the pivot member to slide within the recess.

19. The switch body of claim 15, wherein the light transmissive material is a translucent plastic.

20. The switch body of claim 15, wherein the opening is substantially circular.

* * * * *